(12) United States Patent
Keen et al.

(10) Patent No.: US 11,122,141 B2
(45) Date of Patent: Sep. 14, 2021

(54) MANAGING OR MODIFYING ONLINE CONTENT ACCORDING TO COGNITIVELY IDENTIFIED CREATOR AND ORGANIZATION RELATIONSHIPS

(71) Applicant: INTERNATIONAL BUSINESS MACHINES CORPORATION, Armonk, NY (US)

(72) Inventors: Martin G. Keen, Cary, NC (US); Grant Mericle, Durham, NC (US); Martin Presler-Marshall, Chapel Hill, NC (US); Ravi Ranjan, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 70 days.

(21) Appl. No.: 16/028,186

(22) Filed: Jul. 5, 2018

(65) Prior Publication Data
US 2020/0014774 A1 Jan. 9, 2020

(51) Int. Cl.
| | | |
|---|---|---|
| H04L 29/08 | (2006.01) | |
| G06Q 30/02 | (2012.01) | |
| G06F 16/9535 | (2019.01) | |
| G06Q 50/00 | (2012.01) | |

(52) U.S. Cl.
CPC ........ *H04L 67/306* (2013.01); *G06F 16/9535* (2019.01); *G06Q 30/0277* (2013.01); *G06Q 50/01* (2013.01)

(58) Field of Classification Search
CPC ........ G06F 13/00; G06F 16/951; G06F 17/30; G06F 17/30864; G06F 16/9535; G06F 17/30867; G06Q 10/06; G06Q 10/10; G06Q 10/105; G06Q 10/1053; G06Q 10/1095; G06Q 30/08; G06Q 50/00; G06Q 50/01; G06Q 30/02; G06Q 30/0201; G06Q 30/0205; G06Q 30/0207; G06Q 30/0212; G06Q 30/0241; G06Q 30/0242; G06Q 30/0251; G06Q 30/0261; G06Q 30/0277; G06Q 50/08; H04L 12/2602; H04L 29/06; H04L 29/08072; H04L 41/22; H04L 43/00; H04L 12/581; H04L 29/08; H04L 29/06027; H04L 67/02; H04L 67/10; H04L 67/306; H04L 67/00; H04W 4/14
USPC .................................. 705/321; 709/224, 204
See application file for complete search history.

(56) References Cited

U.S. PATENT DOCUMENTS

| | | | |
|---|---|---|---|
| 9,147,202 B1 * | 9/2015 | Muse | ................ G06Q 30/0277 |
| 9,230,229 B2 | 1/2016 | Subramanian et al. | |
| 2011/0282823 A1 | 11/2011 | Yahia et al. | |
| 2014/0297403 A1 | 10/2014 | Parsons et al. | |
| 2017/0346772 A1 * | 11/2017 | Albouyeh | ............... H04L 51/10 |
| 2019/0019159 A1 * | 1/2019 | Champaneria | ..... G06Q 10/1053 |

\* cited by examiner

*Primary Examiner* — Robert B Harrell
(74) *Attorney, Agent, or Firm* — Griffiths & Seaton PLLC

(57) ABSTRACT

Embodiments for managing online content by one or more processors are described. An identification of a content creator and an identification of an organization are received. A relationship associated with the content creator and the organization is determined based on at least one online data source associated with at least one of the content creator and the organization. A signal representative of the determined relationship between the content creator and the organization is generated.

21 Claims, 7 Drawing Sheets

MANAGING OR MODIFYING ONLINE CONTENT ACCORDING TO COGNITIVELY IDENTIFIED CREATOR AND ORGANIZATION RELATIONSHIPS

BACKGROUND OF THE INVENTION

Field of the Invention

The present invention relates in general to computing systems, and more particularly, to various embodiments for managing online content based on relationships of the content creator.

Description of the Related Art

It is often difficult to distinguish between, for example, paid advertising and genuinely expressed sentiment in online (e.g., Internet, web, etc.) content. Often, organizations (e.g., companies) provide incentives to content creators (e.g., "influencers") on online channels, such as social media platforms (or networks), blogs, etc., to share content related to a particular product or service. For example, a company may provide a free sample of a product and/or a fee in return for the content creator providing an online review, a free conference pass in exchange for the influencer sharing/posting about the event(s) at the conference, etc.

In some cases, the influencer discloses (e.g., within the online content) the relationship with the organization. However, often such relationships are not disclosed. As a result, it is sometimes difficult for viewers to determine the objectivity of the content.

SUMMARY OF THE INVENTION

Various embodiments for managing online content by one or more processors are described. In one embodiment, by way of example only, a method for managing online content, again by one or more processors, is provided. An identification of a content creator and an identification of an organization are received. A relationship associated with the content creator and the organization is determined based on at least one online data source associated with at least one of the content creator and the organization. A signal representative of the determined relationship between the content creator and the organization is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

Figure 1:
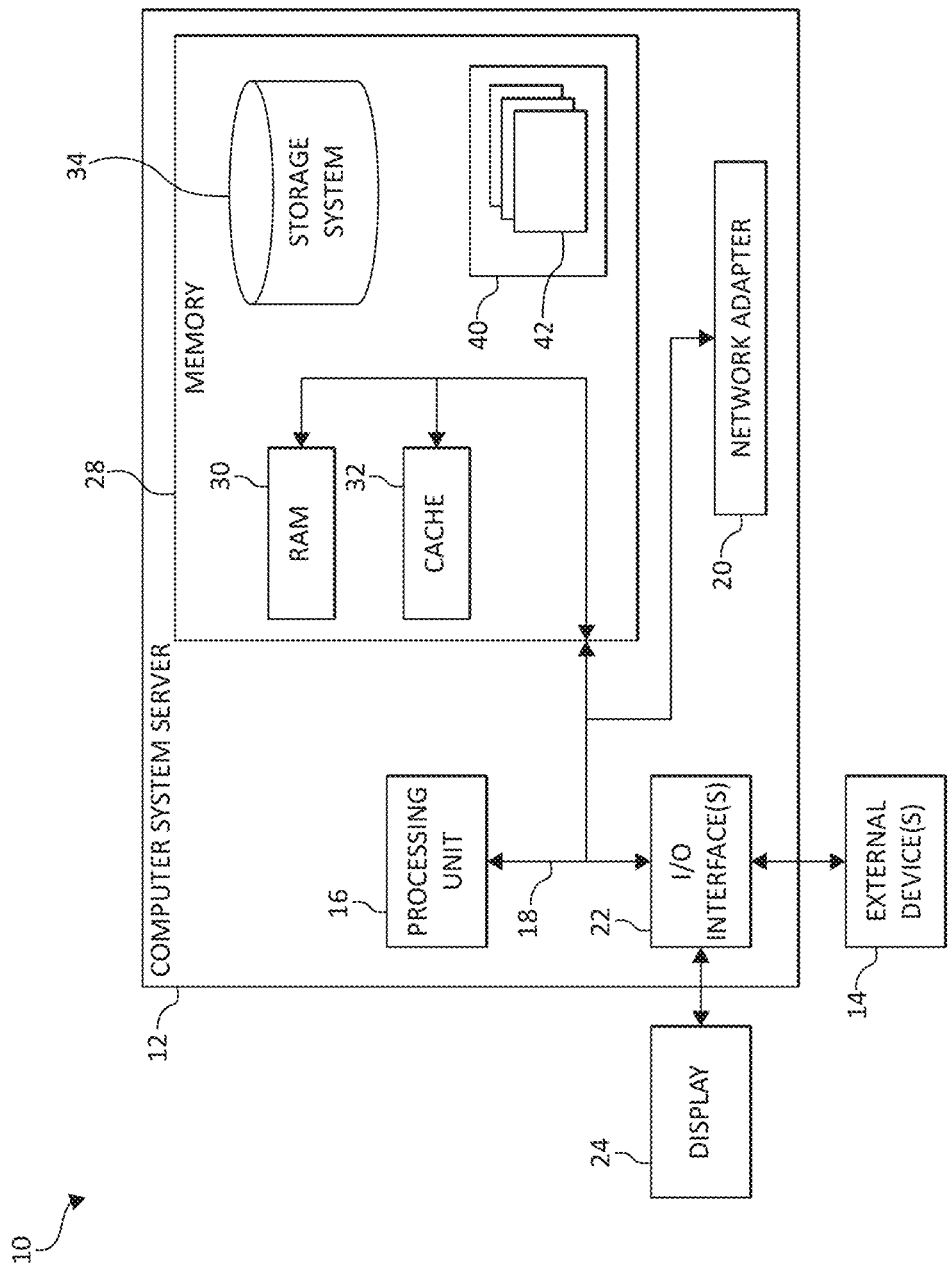
FIG. 1 is a block diagram depicting an exemplary computing node according to an embodiment of the present invention.

As discussed above, it is often difficult to distinguish between, for example, paid advertising and genuinely expressed sentiment in online (e.g., Internet, web, etc.) content. Often, organizations (e.g., companies) provide incentives to content creators (e.g., "influencers") on online channels, such as social media platforms (or networks), blogs, etc., to share content related to a particular product or service.

For example, a company may provide a free sample of a product in return for the content creator providing an online review. Similarly, a company may give the influencer a free conference pass in exchange for the influencer sharing/posting about the event(s) at the conference. As another example, the influencer may receive a fee from the company in exchange for writing a blog post, or some other form of online content, about a product or service.

In some cases, the influencer discloses (e.g., within the online content) the relationship with the organization (e.g., by stating the product was provided for free in return for the review). However, often such a relationship is not disclosed. As a result, it is sometimes difficult for viewers (i.e., of the online content) to determine the objectivity of the content.

To address these needs, some embodiments described herein provide, for example, methods and systems for informing viewers (or readers) of online content when the influencer (or content creator) has, or at least potentially has, a relationship with a product, service, and/or organization mentioned in their online content. For example, in some embodiments, the content is modified by adding an annotation that indicates the relationship, thereby assisting the viewers in determining the authenticity and/or objectivity of the posted content.

According to some embodiments described herein, a cognitive analysis is performed on various data related to the content creator to determine if the content creator has a relationship, or at least a potential relationship, with a particular organization (e.g., a company). The data may be retrieved (and/or scanned) from various online sources or channels, such as social media platforms (or networks), electronic messages (e.g., email, messaging, etc.), and various types of websites, such as video sharing (or streaming) websites, blogs, product review websites, discussion forums, etc. The cognitive analysis may include classifying natural language, analyzing tone, and analyzing sentiment (e.g., scanning for keywords, key phrases, etc.) of previous online content, as well as other information related to the content (e.g., an identification of the channel, the audience/viewers, a title, label, and/or description of the content, etc.) and any information available related to the influencer (e.g., his/her location at particular times).

Based on the cognitive analysis, relationships between the influencer and products, services, and/or organizations may be determined and/or identified, such as by identifying explicit disclosures of the relationships and/or deriving the possibility of such relationships. Specifically, in some embodiments, the cognitive system may identify explicitly stated relationships between an influencer and a given product, service, and/or organization for the purposes of annotating social network posts and content created by that influencer to disclose this relationship. The cognitive system may (also) identify explicitly stated relationships between an influencer and related products, services, and/or organizations for the purposes of annotating social network posts and content created by that influencer to disclose these relationships. The cognitive system may (also) derive undisclosed relationships between an influencer and a given product, service, and/or organization for the purposes of annotating social network posts and content created by that influencer to disclose this potential relationship.

As such, in some embodiments, the methods and/or systems described herein may utilize "machine learning," "cognitive modeling," "cognitive analysis," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, influencers' relationships or potential relationships with products, services, and/or organizations based on, for example, online data. Utilizing the models, the performance (or operation) of the system (e.g., utilizing/based on new inputs) may be predicted and/or the performance of the system may be optimized by investigating how changes in the input(s) effect the output(s). Users may provide feedback on the models, thus allowing the performance/accuracy of the system to improve over time.

In some embodiments, a requester (e.g., individual or entity utilizing the methods and systems described herein) first specifies an influencer to analyze and a product, service, and/or organization. The requester initiates a request to determine if the stated influencer has, or may have, a relationship with the product, service, and/or organization. The online channels (e.g., social networks, websites, etc.) used by the influencer are then identified. Disclosed relationships with the product, service, and/or organization are identified through the cognitive analysis. Disclosed relationships with related products, services, and/or organizations (i.e., other products, services, and/or organizations related to the specified product/service/organization) are identified through the cognitive analysis. Derived and/or potential relationships with the product, service, and/or organization are identified through the cognitive analysis. These relationships may then be presented to the requester, where they can be rendered and presented to a user alongside any content an influencer publishes related to the stated product, service, and/or organization.

In particular, in some embodiments, a method by one or more processors, for managing online content is provided. An identification of a content creator and an identification of an organization are received. A relationship associated with the content creator and the organization is determined based on at least one online data source associated with at least one of the content creator and the organization. A signal representative of the determined relationship between the content creator and the organization is generated.

The at least one online data source may include at least one of a social media platform and a website. The determining of the relationship may be based on identifying a disclosure of the relationship within the at least one online data source. The determined relationship may be between the content creator and the organization or between the content creator and a second organization related to the organization. The determining of the relationship may include deriving a potential relationship between the content creator and the organization based on the at least one online data source.

A piece of online content associated with the content creator may be modified based on the determined relationship. The modifying of the piece of online content associated with the content creator may include adding a disclosure of the determined relationship to the piece of online content.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
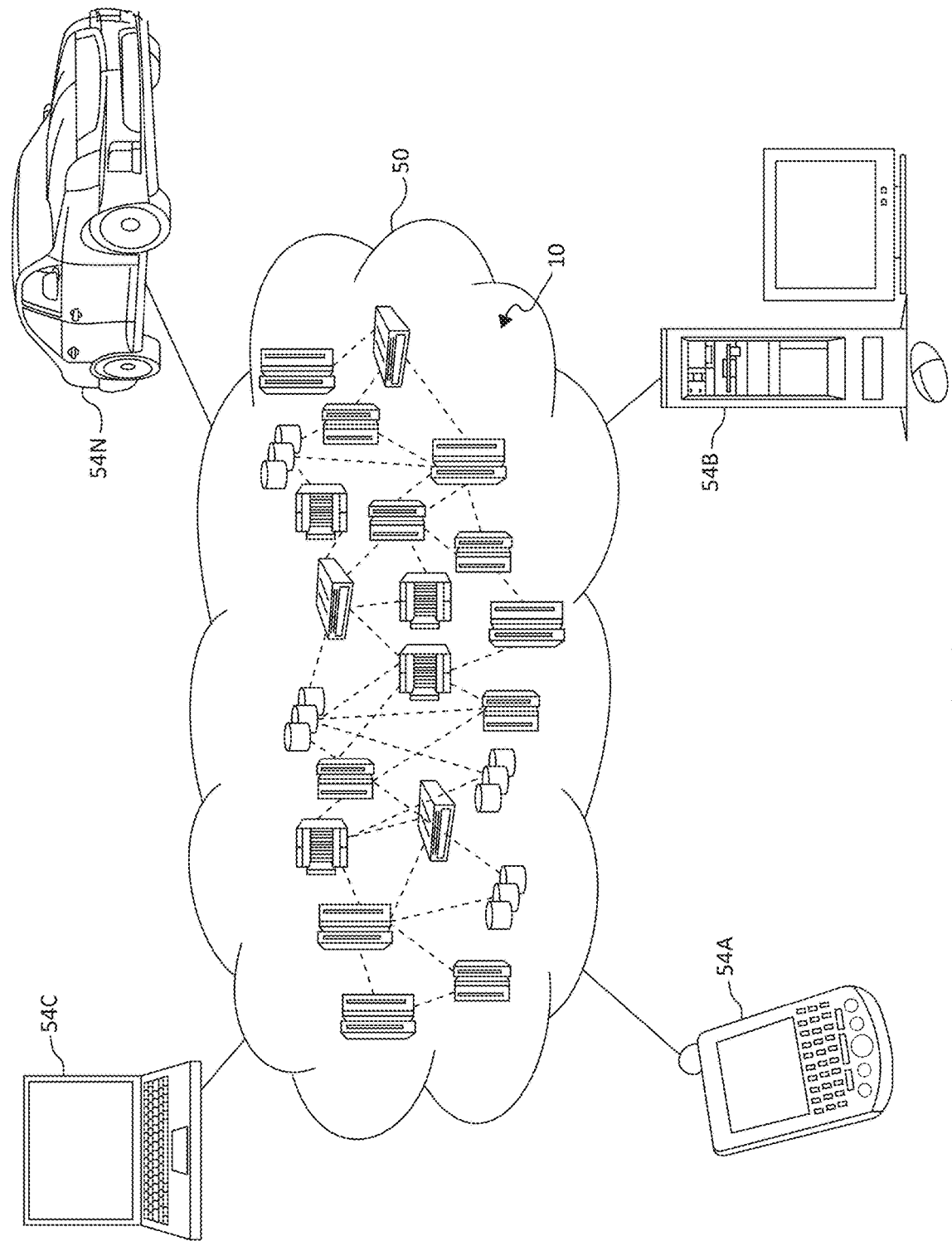
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and vehicles (e.g., automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
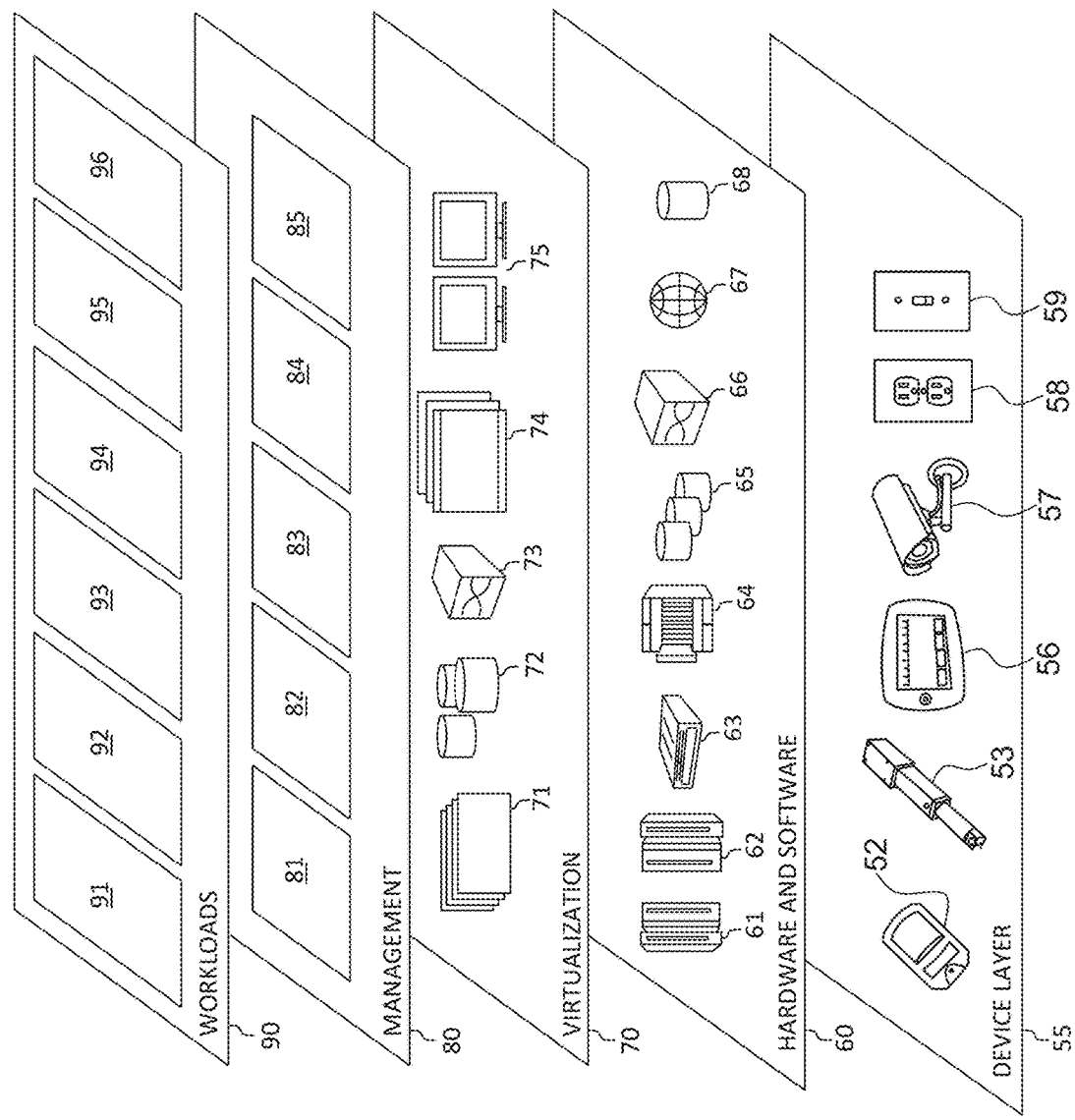
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing online content as described herein. One of ordinary skill in the art will appreciate that the workloads and functions 96 for managing online content may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As mentioned above, in some embodiments, a cognitive analysis is performed on various data related to the content creator (or influencer) to determine if the content creator has a relationship, or at least a potential relationship, with a particular organization (e.g., a company). The data may be retrieved (and/or scanned) from various online sources or channels, such as social media platforms (or networks), electronic messages (e.g., email, messaging, etc.), and various types of websites, such as video sharing (or streaming) websites, blogs, product review websites, discussion forums, etc. The cognitive analysis may include classifying natural language, analyzing tone, and analyzing sentiment (e.g., scanning for keywords, key phrases, etc.) of previous online content, as well as other information related to the content (e.g., an identification of the channel, the audience/viewers, a title, label, and/or description of the content, etc.) and any information available related to the influencer (e.g., his/her location at particular times). Based on the cognitive analysis, relationships (e.g., disclosed, related, and/or derived relationships) between the influencer and products, services, and/or organizations may be determined and/or identified. The relationship(s) may be stored and then used to modify content created by the influencer (e.g., by adding a disclosure regarding the relationship(s) to the content), such as before it is posted/published online.

In some embodiments, the identity (or identification) of an influencer (or content creator) and/or the identity of a product, service, and/or organization are received (or retrieved). The influencer may be any entity (e.g., an individual, group of individuals, organization, etc.) that may create online content, as described herein. The product, service, and/or organization may be any suitable product, service, and/or organization that may be associated with any online content (e.g., mentioned in an online review), such as companies that make and/or sell products. For the sake of simplicity, the product, service, and/or organization may be referred to below as simply "the organization," though it should be understood that such may refer to any entity associated with online content (e.g., created by the influencer), including individuals (e.g., an individual who offers a service).

The identities of the influencer and the organization may be manually provided (e.g., entered via a computing device) by a user (e.g., an individual or organization utilizing the methods/systems described herein). However, the identities may also be retrieved via an automated analysis of any available data sources. For example, the available data sources associated with a particular influencer, or those associated with multiple influencers, may be scanned for references to any products, services, organizations, etc.

In some embodiments, such as when a particular influencer has been identified, a search is performed (e.g., automatically performed) to create a list of data sources associated with the influencer and/or a profile of the influencer. The data sources (and/or profile) may include, for example, all social network and content creation channels where the influencer is active. Alternatively, a full or partial profile may be manually provided to the system. For example, the influencer's identification on a particular social media network and his/her blog website may be manually provided by a user, and the system may then automatically search for other channels where the influencer shares content.

Figure 4:
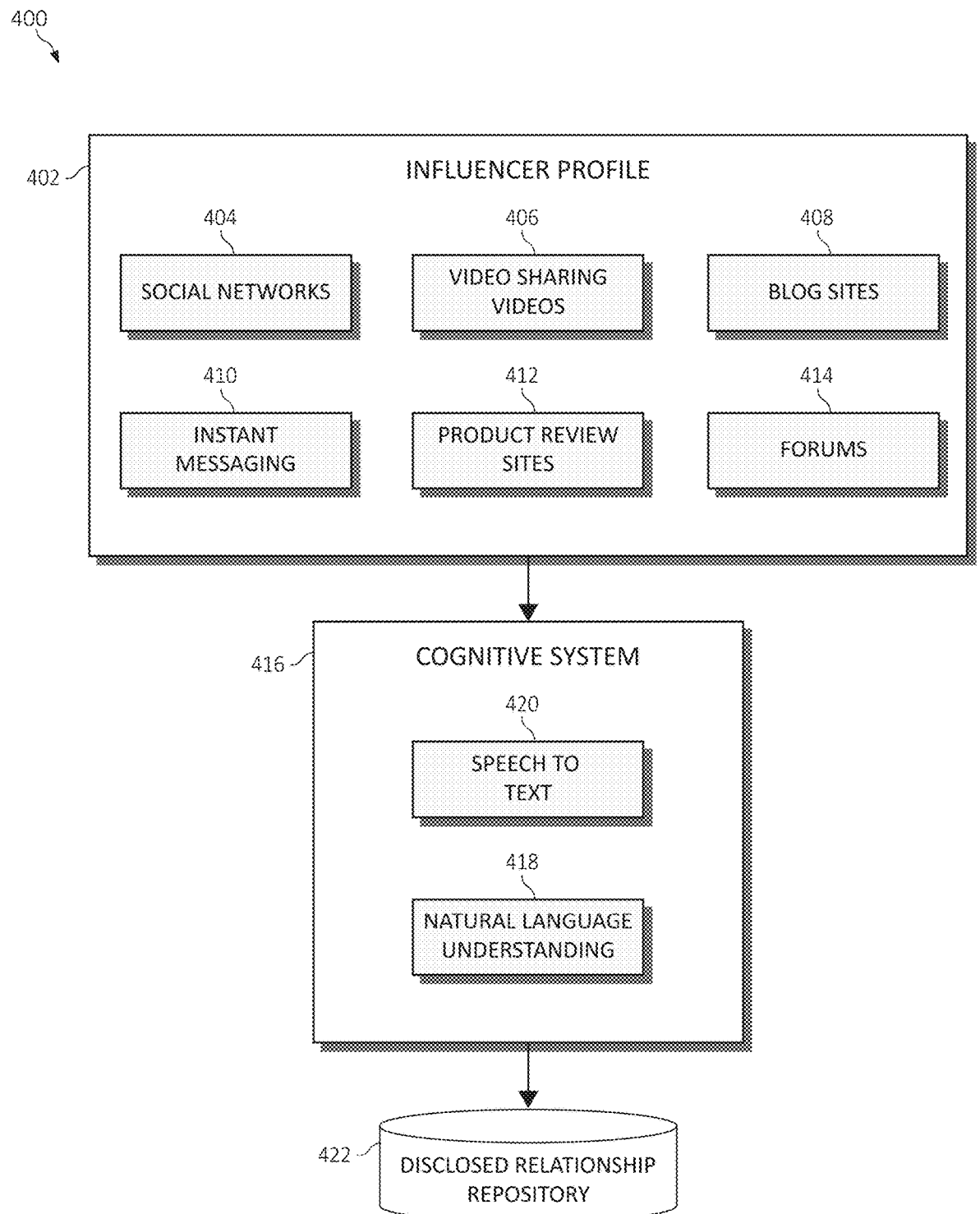
FIGS. 4-6 are flowchart/block diagrams of systems for managing online content according to embodiments of the present invention.

Referring now to FIG. 4, a system 400 according to some embodiments described herein is shown. As shown, the system 400 includes an influencer profile 402, as described above. In the example shown, the data sources associated with the influencer include social networks 404, video sharing networks (or websites) 406, blog websites 408, instant messaging applications 410, product review websites (e.g., e-commerce websites) 412, and discussion forums 414 (i.e., at least one of each).

In some embodiments, the methods and systems described herein utilize such data sources associated with the influencer to determine (and/or identify) relationships between the influencer and organizations, as described above. The relationships may include disclosed relationships, related relationships, and derived relationships, as described in greater detail below.

In the example shown in FIG. 4, the influencer profile 402 is sent to (and/or retrieved by) a cognitive analysis system (or cognitive system) 416, which includes a speech-to-text module 418 and a natural language understanding module (or language module) 420. In the particular embodiment shown, the cognitive system 416 analyzes the influencer profile (and/or the data sources 404-414) searching for disclosed relationships, which are then sent to a disclosed relationship repository (or database) 422. However, in some embodiments, the cognitive system 416 is also used to search for/identity related relationships and derived relationships, as described in greater detail below.

With respect to disclosed relationships, the system 400 (or the cognitive system 416) analyzes the data sources 404-414, searching for disclosures of a relationship between the influencer and an organization (or product or service), such as one specified by the user. In particular, the cognitive system 416 may be used to parse the content available on the data sources 404-414. For example, the speech-to-text module 418 may convert audio/voice content (e.g., podcasts or video) to written text (or transcribed), which may then be analyzed by the language module 420. The language module 420 may analyze text to extract meta-data from content, such as concepts, entities, keywords, categories, sentiment, emotion, relations, and semantic roles. For example, the language module 420 may classify the sentence, "These Acme X90 headphones were provided for free in exchange for an honest review," to indicate a relationship between Acme X90 headphones (and/or the company, Acme) and the influencer. Any identified disclosed relationships are sent to (and/or stored in) the disclosed relationship repository 422.

With respect to related relationships, the system 400 (or the cognitive system 416) analyzes the data sources 404-414 in a manner similar to that for disclosed relationships but with respect to products, services, and/or organizations that are related to the one previously identified (in such embodiments). That is, the system 400 may search for data that indicates the influencer has a relationship with another (or second) product, service, and/or organization that is related to the previously identified product, service, and/or organization (e.g., a competitor thereof, in the same industry, a subsidiary thereof, etc.). For example, with respect to related products, if the system 400 is searching for disclosures concerning a particular set of headphones (e.g., Acme X90), the system 400 may (also) identify disclosures concerning other types of headphones (e.g., different models, different manufacturers, etc.). Such information may indicate that the influencer frequently receives free samples of headphones (or some other incentive) for review purposes. With respect to related services/organizations, if the system 400 is searching for disclosures related to a particular company, the system may (also) identify disclosures concerning competitors of that company, which may indicate that the influencer has a relationship with the competitor. Any identified related relationships are sent to (and/or stored in) an appropriate database, such as a related relationship repository (not shown in FIG. 4).

With respect to derived relationships, the system 400 (and/or the cognitive system 416) analyzes the data sources 404-414, searching for data/information that may indicate that the influencer has a relationship (i.e., a derived or potential relationship) with an organization (or product or service), such as one specified by the user, which is not specifically or explicitly disclosed in any of the available data. In other words, the system 400 may search for data that is indicative of the influencer having an undisclosed relationship with an organization. For example, social network "check-ins" may indicate that an influencer has frequently visited an organization's headquarters, which may be indicative of a relationship. Similarly, social network posts may use language that implies, but does not explicitly state, a relationship. For example, a post that includes "Thanks @Acme for sending me these great headphones" may indicate a relationship between the influencer and that organization. As another example, photographs posted on a social network may indicate that the influencer has a close relationship with an organization's employees. In such an example, the identity of the individuals in the photograph may be determined using facial recognition technology and/or text/tags associated with the photograph (e.g., the names of the individuals).

In some embodiments, any derived relationships may be assigned a confidence level. For example, a score (or grade) may be computed for the derived relationships based on the appropriate data identified in the data sources 404-414. The score may be based on any suitable scale (e.g., positive or negative integers). The derived relationships, and perhaps a score/grade associated therewith, are sent to (and/or stored in) an appropriate database, such as a derived relationship repository (not shown in FIG. 4).

In some embodiments, the user is given access to any identified relationships (or the repositories described above) and/or such relationships are sent to the user. As described above, the relationships may include disclosed relationships, related relationships, and derived relationships. In particular, the disclosed relationships may include a list of relationships as determined by the identifying of explicit disclosures related to a particular product, service, and/or organization (e.g., a disclosure that the influencer received a pair of Acme X90 headphones in exchange for writing a review on a particular e-commerce website). The related relationships may include a list of relationships as determined by the identifying of explicit disclosures concerning a particular product, service, and/or organization that is related to a particular product, service, and/or organization (e.g., a disclosure that the influencer received six pairs of headphones other than Acme X90 headphones in exchange for writing reviews on a particular e-commerce website). The derived relationships may include a list of relationships derived for a particular product, service, and/or organization (e.g., an 85% confidence level that an influencer was provided with a free pair of Acme X90 headphones based on social network posts and photographs of the influencer with an executive officer of Acme).

Figure 5:
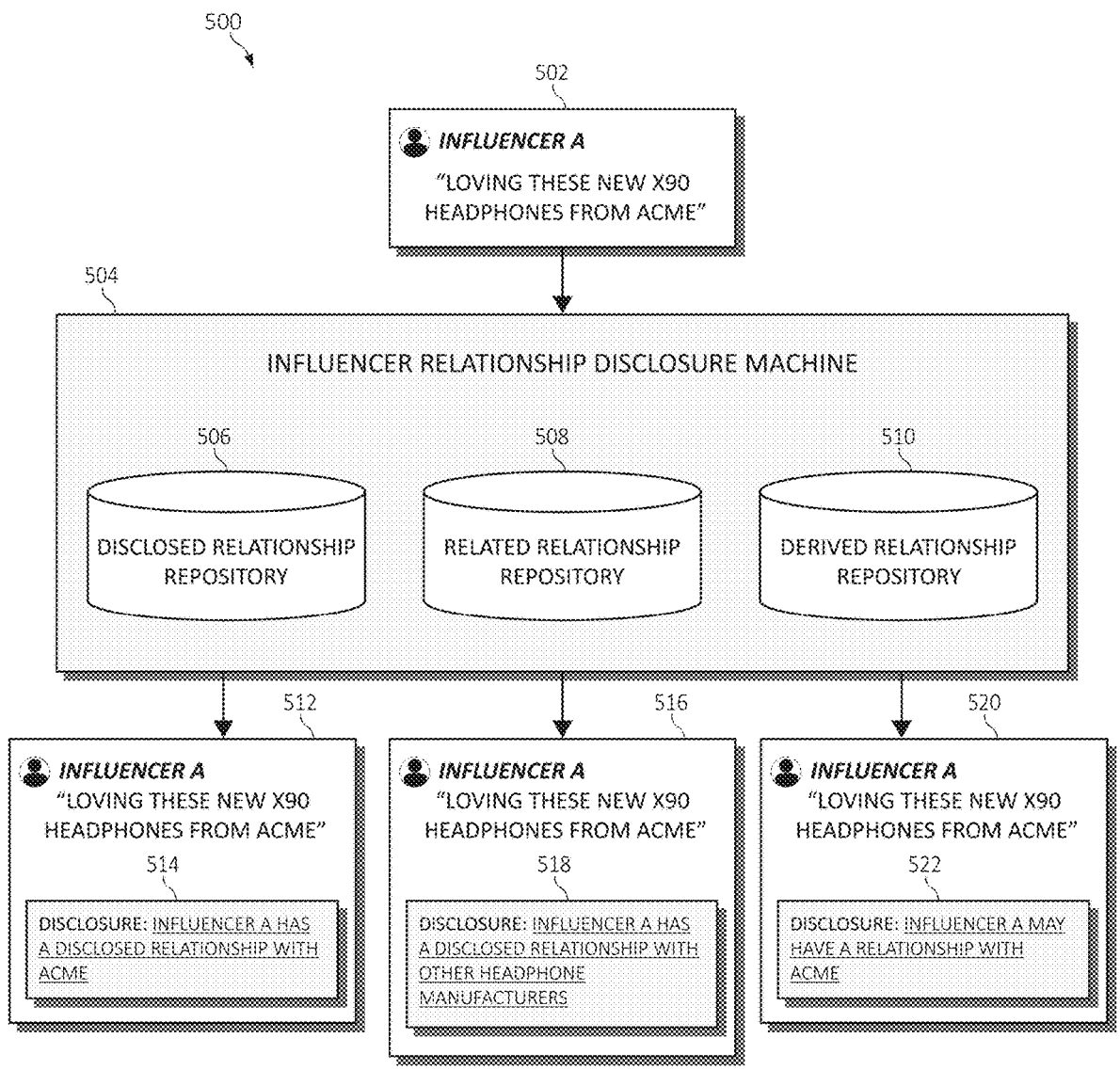

Referring now to FIG. 5, a system 500, according to some embodiments described herein, is shown. A user utilizing the methods/systems described herein receives a piece of online content 502 (e.g., a social media post or online review). As shown, the piece of content is associated with "Influencer A" and mentions "X90 headphones." An influencer relationship disclosure system 504 that includes a disclosed relationship repository 506, a related relationship repository 508, and a derived relationship repository 510 (e.g., similar to those described above) is then utilized to search for any relationships, or potential relationships, between Influencer A and X90 headphones and/or the company that makes X90 headphones (e.g., Acme).

In some embodiments, if any such relationships are found with the repositories 506-510, the piece of content 502 is appropriately modified (e.g., before being posted/made available online). For example, if a disclosed relationship is identified (or found), modified content 512 may be generated, which includes annotation 514, "Disclosure: Influencer A has a disclosed relationship with Acme." If a related relationship is identified, modified content 516 may be generated, which includes annotation 518, "Disclosure: Influencer A has a disclosed relationship with other headphone manufacturers." If a derived relationship is identified, modified content 520 may be generated, which includes annotation 522, "Disclosure: Influencer A may have a relationship with Acme." With respect to derived relationships having confidence scores, it should be understood that in some embodiments, the derived relationships are only utilized if the confidence score thereof is above a predetermined threshold (e.g., 80%).

Figure 6:
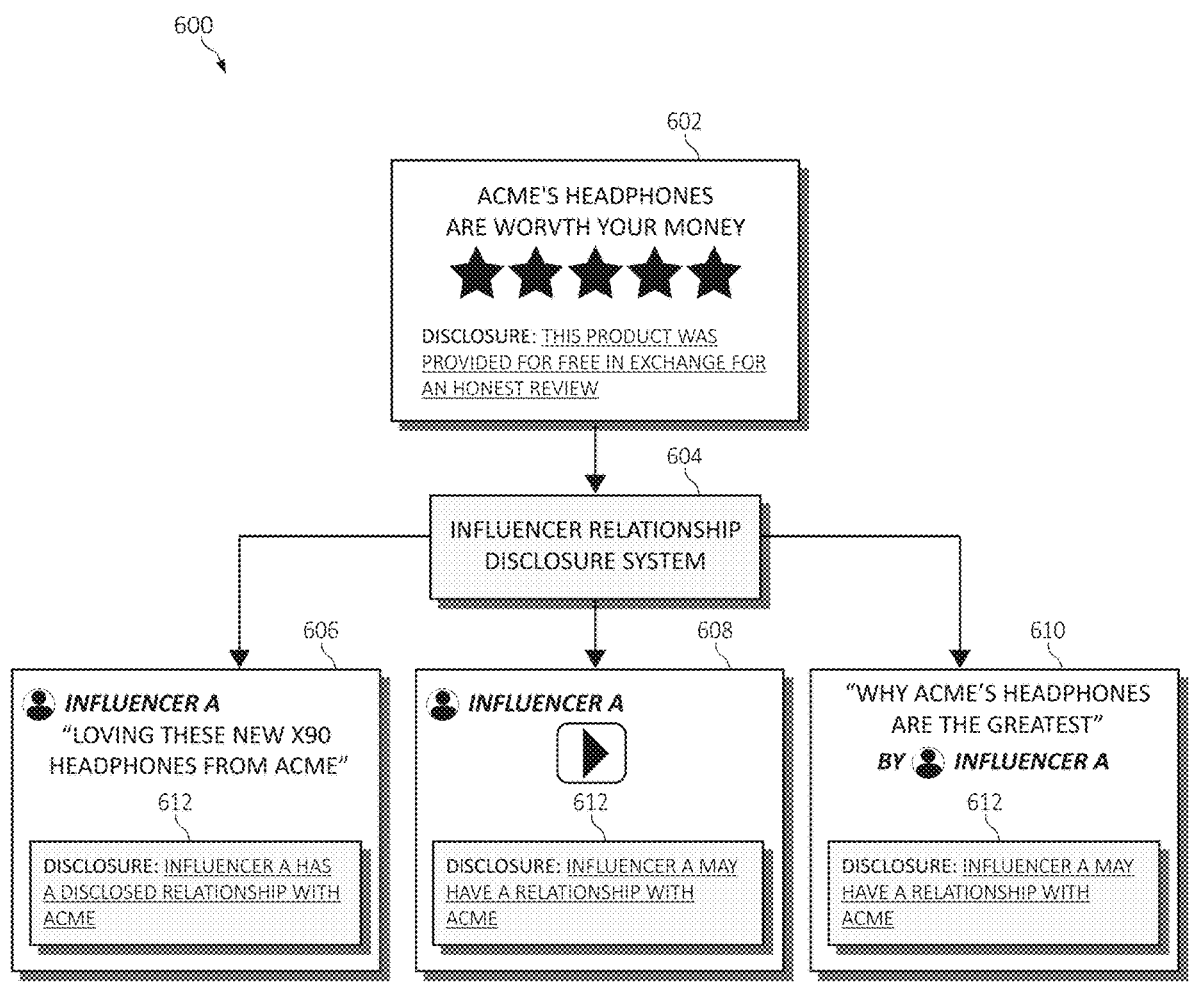

Referring now to FIG. 6, a system 600, according to some embodiments described herein, is shown. A piece of online content 602, which is associated with a particular influencer (e.g., Influencer A) and a particular product, service, and/or organization (e.g., Acme) is identified (e.g., within the online data sources associated with Influencer A, as described above). As shown, the piece of content 602 is a review of, or at least a general statement about, Acme headphones, and includes an explicit disclosure, "Disclosure: This product was provided for free in exchange for an honest review." An influencer relationship disclosure system 604 may analyze the piece of content, determine a relationship (e.g., a disclosed relationship) between Influencer A and Acme, and store the relationship, as described above. The influencer relationship disclosure system 604 may then be utilized by users to modify (e.g., annotate) other pieces of content created by Influencer A (e.g., pieces of content related to Acme), as described above. In the example shown, a social network post 612, a video 608 posted to a video sharing website, and a blog post 610 have been modified to include annotation 612, "Disclosure: Influencer A has a relationship with Acme."

Figure 7:
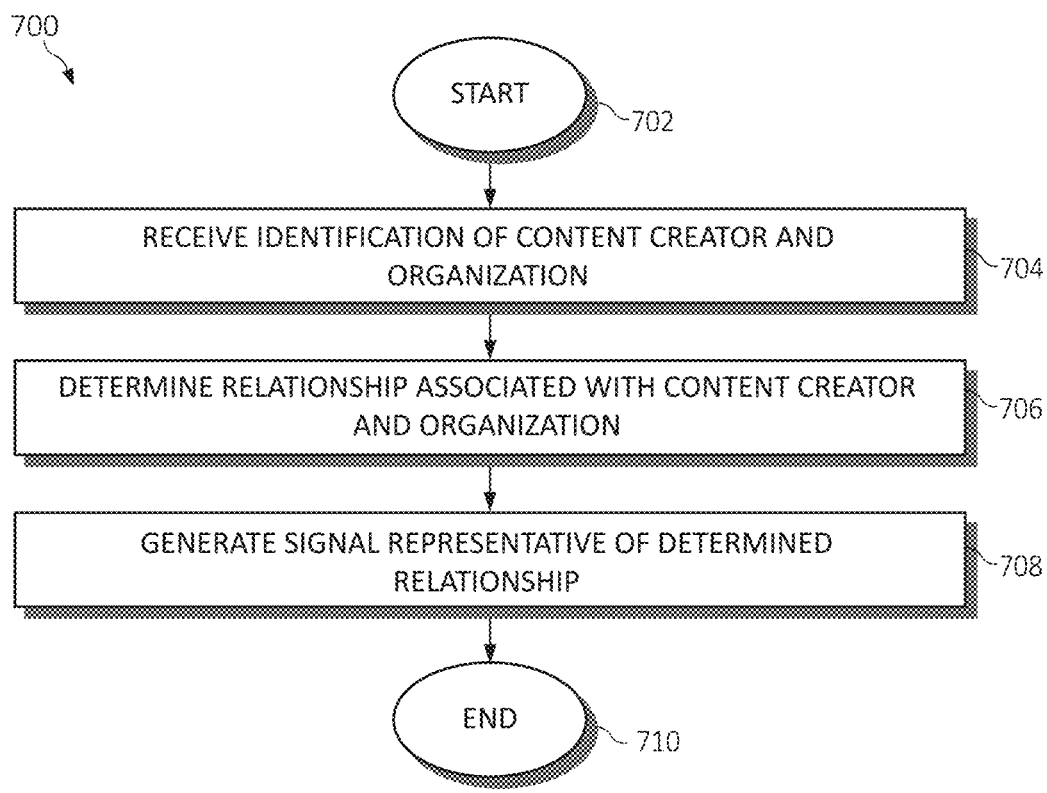
FIG. 7 is a flowchart diagram of an exemplary method for managing online content according to an embodiment of the present invention.

Turning to FIG. 7, a flowchart diagram of an exemplary method 700 for managing online content, according to some embodiments described herein, is provided. Method 700 begins (step 702) with, for example, various types of online content created by content creators (or influencers) being posted/made available online.

An identification of a content creator and an identification of an organization (or product or service) are received (or determined) (step 704). In some embodiments, the identities of the content creator and/or the organization are manually entered by a user. However, in some embodiments, the identity of the content creator and/or the organization may be automatically determined (e.g., by scanning various online data sources).

A relationship associated with the content creator and the organization is determined based on at least one online data source associated with at least one of the content creator and the organization (step 706). The at least one online data source may include at least one of a social media platform and a website. The determining of the relationship may be based on identifying a disclosure of the relationship within the at least one online data source. The determined relationship may be between the content creator and the organization or between the content creator and a second organization related to the organization. The determining of the relationship may include deriving a potential relationship between the content creator and the organization based on the at least one online data source.

A signal representative of the determined relationship between the content creator and the organization is generated (step 708). For example, the determined relationship may be sent to and/or stored on a memory (or in a database) and/or sent to the user via an electronic message (e.g., email, text message, etc.).

Method 700 ends (step 710) with, for example, the determined relationship(s) being made accessible to a user (e.g., a user of the methods/systems described herein). As described above, the determined relationship may be used to modify (subsequent) pieces of online content associated with the content creator. For example, the modifying of the piece of online content associated with the content creator may include adding an annotation to the piece of online content, such as by adding a disclosure or description of the determined relationship to the piece of online content (e.g., before the piece of content is posted/made available online).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing online content comprising:
   receiving an identification of a content creator and an identification of an organization;
   determining a relationship between the content creator and the organization based on at least one online data source associated with at least one of the content creator and the organization, wherein the relationship exists prior to a creation, by the content creator, of online content associated with a product or service of the organization and comprises a remuneration, by the organization to the content creator, for creating the online content contingent upon an agreement between the content creator and the organization formed prior to the creation of the online content, and wherein the relationship is determined notwithstanding whether the relationship is explicitly disclosed in the at least one online data source; and
   responsive to determining the relationship, generating a signal representative of the determined relationship between the content creator and the organization, wherein the determined relationship includes disclosed relationships and derived relationships, wherein generating the signal includes generating a list of the disclosed relationships and the derived relationships, and wherein the derived relationships included on the list are each associated and indicated with a confidence score that the remuneration was performed based on correlations of data linking the content creator to the organization as identified in the at least one online data source.

2. The method of claim 1, wherein the determining of the relationship is based on identifying a disclosure of the relationship within the at least one online data source.

3. The method of claim 2, wherein the determined relationship is between the content creator and the organization or between the content creator and a second organization related to the organization.

4. The method of claim 1, further comprising modifying a piece of the online content associated with the content creator based on the determined relationship.

5. The method of claim 4, wherein the modifying of the piece of online content associated with the content creator includes adding a disclosure of the determined relationship to the piece of online content.

6. The method of claim 1, wherein the at least one online data source includes at least one of a social media platform and a website.

7. The method of claim 1, wherein the determining of the relationship includes deriving a potential relationship between the content creator and the organization based on the at least one online data source.

8. A system for managing online content comprising:
   at least one processor that
      receives an identification of a content creator of online entertainment media and an identification of an organization;
      determines a relationship between the content creator and the organization based on at least one online data source associated with at least one of the content creator and the organization, wherein the relationship exists prior to a creation, by the content creator, of online content associated with a product or service of the organization and comprises a remuneration, by the organization to the content creator, for creating the online content contingent upon an agreement between the content creator and the organization formed prior to the creation of the online content, and wherein the relationship is determined notwithstanding whether the relationship is explicitly disclosed in the at least one online data source; and
      responsive to determining the relationship, generates a signal representative of the determined relationship between the content creator and the organization, wherein the determined relationship includes disclosed relationships and derived relationships, wherein generating the signal includes generating a list of the disclosed relationships and the derived relationships, and wherein the derived relationships included on the list are each associated and indicated with a confidence score that the remuneration was performed based on correlations of data linking the content creator to the organization as identified in the at least one online data source.

9. The system of claim 8, wherein the determining of the relationship is based on identifying a disclosure of the relationship within the at least one online data source.

10. The system of claim 9, wherein the determined relationship is between the content creator and the organization or between the content creator and a second organization related to the organization.

11. The system of claim 8, wherein the at least one processor further modifies a piece of the online content associated with the content creator based on the determined relationship.

12. The system of claim 11, wherein the modifying of the piece of online content associated with the content creator includes adding a disclosure of the determined relationship to the piece of online content.

13. The system of claim 8, wherein the at least one online data source includes at least one of a social media platform and a website.

14. The system of claim 8, wherein the determining of the relationship includes deriving a potential relationship between the content creator and the organization based on the at least one online data source.

15. A computer program product for managing online content by one or more processors, the computer program product comprising a non-transitory computer-readable storage medium having computer-readable program code portions stored therein, the computer-readable program code portions comprising:

an executable portion that receives an identification of a content creator and an identification of an organization;

an executable portion that determines a relationship between the content creator and the organization based on at least one online data source associated with at least one of the content creator and the organization, wherein the relationship exists prior to a creation, by the content creator, of online content associated with a product or service of the organization and comprises a remuneration, by the organization to the content creator, for creating the online content contingent upon an agreement between the content creator and the organization formed prior to the creation of the online content, and wherein the relationship is determined notwithstanding whether the relationship is explicitly disclosed in the at least one online data source; and an executable portion that, responsive to determining the relationship, generates a signal representative of the determined relationship between the content creator and the organization, wherein the determined relationship includes disclosed relationships and derived relationships, wherein generating the signal includes generating a list of the disclosed relationships and the derived relationships, and wherein the derived relationships included on the list are each associated and indicated with a confidence score that the remuneration was performed based on correlations of data linking the content creator to the organization as identified in the at least one online data source.

16. The computer program product of claim 15, wherein the determining of the relationship is based on identifying a disclosure of the relationship within the at least one online data source.

17. The computer program product of claim 16, wherein the determined relationship is between the content creator and the organization or between the content creator and a second organization related to the organization.

18. The computer program product of claim 15, wherein the computer-readable program code portion further includes an executable portion that modifies a piece of the online content associated with the content creator based on the determined relationship.

19. The computer program product of claim 18, wherein the modifying of the piece of online content associated with the content creator includes adding a disclosure of the determined relationship to the piece of online content.

20. The computer program product of claim 15, wherein the at least one online data source includes at least one of a social media platform and a website.

21. The computer program product of claim 15, wherein the determining of the relationship includes deriving a potential relationship between the content creator and the organization based on the at least one online data source.

* * * * *